United States Patent [19]

Shfaram et al.

[11] Patent Number: 4,735,363
[45] Date of Patent: Apr. 5, 1988

[54] METHOD FOR PRODUCING A DRIP IRRIGATION LINE AND AN EMITTER THEREFOR

[75] Inventors: Adiel Shfaram, Kibbutz Ein Tzurim; Avraham Zakay, Rishon LeZion, both of Israel

[73] Assignee: Plastro Gvat, Kibbutz Gvat, Israel

[21] Appl. No.: 863,504

[22] Filed: May 15, 1986

[30] Foreign Application Priority Data

May 29, 1985 [IL] Israel .......................... 75336

[51] Int. Cl.$^4$ .............................................. A01G 25/02
[52] U.S. Cl. ..................................... 239/542; 239/547
[58] Field of Search ............... 239/542, 547, 550, 551, 239/533.13; 285/200, 205, 921

[56] References Cited

U.S. PATENT DOCUMENTS

| | | | |
|---|---|---|---|
| 1,750,257 | 3/1930 | Bonnell | 285/205 X |
| 3,896,999 | 7/1975 | Barragán | 239/533.13 X |
| 3,953,555 | 4/1976 | Gley | 239/550 X |
| 4,147,307 | 4/1979 | Christy et al. | 239/542 |
| 4,193,711 | 3/1980 | Riusech | 239/542 X |
| 4,209,133 | 6/1980 | Mehouder | 239/542 |
| 4,460,129 | 7/1984 | Olson | 239/542 |

FOREIGN PATENT DOCUMENTS

| | | |
|---|---|---|
| 488245 | 8/1976 | Australia ............ 239/542 |
| 0002336 | 6/1979 | European Pat. Off. . |
| 0018815 | 11/1980 | European Pat. Off. . |
| 1474347 | 5/1977 | United Kingdom . |
| 1509294 | 5/1978 | United Kingdom . |
| 1511403 | 5/1978 | United Kingdom . |

*Primary Examiner*—Andres Kashnikow
*Attorney, Agent, or Firm*—Sandler & Greenblum

[57] ABSTRACT

An emitter for a drip irrigation line is substantially rigid and has a generally L-like shape having a shorter and a longer limb which is insertable into a length of tubing constituting the irrigation line from the outside thereof. The longer, elongated limb of the emitter consists of a body portion having a flow-attenuator through which irrigation liquid enters the emitter. The shorter limb of the emitter has a neck portion through which irrigation exits the emitter. A method for producing a drip irrigation line is also provided.

5 Claims, 2 Drawing Sheets

METHOD FOR PRODUCING A DRIP IRRIGATION LINE AND AN EMITTER THEREFOR

The present invention relates to a method for producing a drip irrigation line in which, when assembled, the flow-attenuating element of the emitter is located inside the line, being inserted into the line from the outside thereof. It also relates to an emitter for such lines.

Drip irrigation emitters have in the past been attached to irrigation lines by drilling, piercing or punching holes into the plastic lines and forcing the inlet member of these emitters into these holes. These relatively thin, tubular members have a pointed head and an undercut neck which renders the head "barbed", i.e., difficult to extract from the hole once pressed into it. The emitter body, accommodating as it does the pressure-reducing and flow-attenuating elements in the form of baffles, labyrinths, pressure-regulating diaphragms and the like, is relatively bulky and remains attached to the outside of the irrigation line.

While attaching the emitter heads in the above manner poses no difficulties, it is the fact that, once attached, the relatively bulky emitter head is located on, and projects from, the irrigation line, which, in practical use, is seen as a serious disadvantage. Operations such as laying, adjusting on the ground, reeling in for storage at the season's end are greatly hampered due to the presence, on the outside of the plastic irrigation lines, of the emitters, cumbersome protruberances which tend to get causht on stones, roots, and similar obstacles, and make the handling of lines that are often tens of meters long, difficult and time-consuming.

It is one of the objects of the present invention to provide a method for producing a drip irrigation line in which, when assembled, the flow-attenuating element is located inside the line, being inserted into the line from the outside thereof, and all that would protrude from the irrigation line would be the low-profile end section of the neck portion of the emitter.

This the present invention achieves by providing a method for producing a drip irrigation line comprising the steps of:

providing at least one, substantially rigid, generally L-shaped emitter, the longer, elongated limb of which consists of a body portion thereof, which comprises flow-attenuating means, through which means irrigation liquid enters said emitter, and the shorter limb of which consists of a neck portion of said emitter, through which neck portion said irrigation liquid exits said emitter;

providing a length of flexible tubing having at least one hole of a size appropriate to said neck portion, and inserting said emitter, body portion first, through said hole from the outside of said tubing into the inside thereof, until said neck portion has entered, and is tightly held in, said hole.

The present invention further provides an emitter for a drip irrigation line, insertable into a length of tubing from the outside thereof and having a generally L-like shape, the longer, elongated limb of which consists of a body portion thereof, which comprises flow-attenuating means, through which means irrigation liquid enters said emitter, and the shorter limb of which consists of a neck portion of said emitter, through which neck portion said irrigation liquid exits said emitter.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
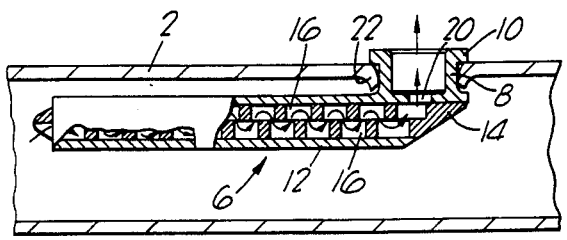
FIG. 1 is a view, in partial cross section, of a piece of drip-irrigation line according to the invention, with a first embodiment of the emitter in position.
Figure 2:
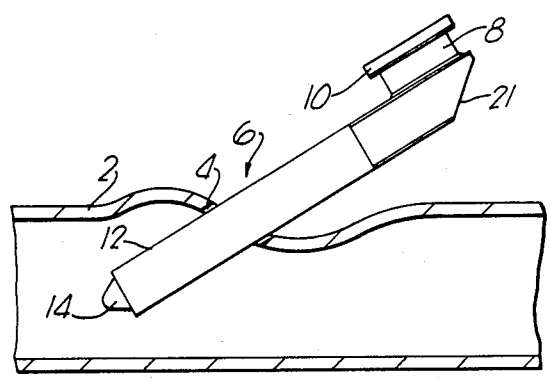
FIG. 2 illustrates the way in which the emitter of Fig. is being inserted into the irrigation-line tubing.

Referring now to the drawings, there is seen in FIGS. 1 and 2 a length of irrigation-line tubing 2 in which has been punched a hole 4 for the insertion therethrough of an emitter. The latter, made of a substantially rigid material, is of a generally L-like shape, the longer, elongated limb of which consists of the body portion 6 and the shorter limb, of the neck portion 8, the free end of which is provided with an outwardly projecting rim portion 10 serving as an abutment against which the emitter is seated.

The body portion 6 comprises a hollow, tubular casing 12 in which is tightly seated a core member 14 that constitutes the flow-attenuating element of the emitter. The attenuating effect is produced, in a per-se known manner, by a series of interconnected recesses 16 which, in conjunction with the respective internal surfaces 18 (see FIG. 3), form a labyrinth-like passage. It is through this passage that the irrigation liquid flows as indicated by the arrows in FIG. 1, entering at the tip of the core 14 and exiting via a hole 20 through the neck portion 8. Along this tortuous path much of the potential energy of the liquid is lost, so that in spite of the substantial line pressure and the relatively large cross section of the flow path, the liquid exits the emitter in a mere trickle.

The emitter having been assembled by pushing the core member 14 into the casing 12, it is then introduced into the tubing 2 through the hole 4 as indicated in FIG. 2, to facilitate which, the rear end of the body portion 6 is provided with a large chamfer 21. It is seen that the diameter of the neck section 8 is larger than the diameter of the hole 4, so that forcing the neck portion 8 into the tubing 2 will raise a flange-like rim 22 that, being pressed against the neck portion 8, will ensure tightness. With some types of plastic tubing 2 it is advantageous to use an appropriate hot-air blower to locally heat and soften the section around the hole 4 before the emitter is inserted into the tubing 2.

Figure 3:
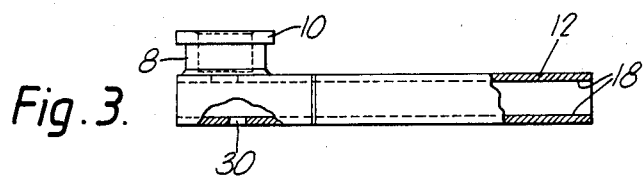
FIG. 3 is a view, in partial cross section, of the casing of the body portion of another embodiment of the emitter, as well as the neck portion thereof.
Figure 4:
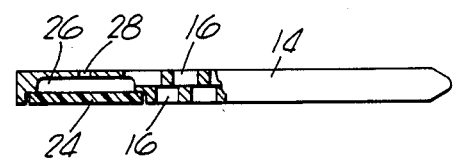
FIG. 4 is a view, in partial cross section, of the core member of the embodiment of FIG. 3, including a flow-regulating diaphragm.
Figure 5:
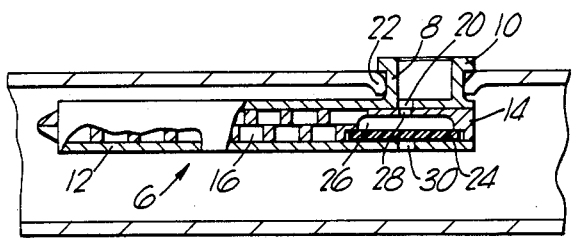
FIG. 5 is a view, in partial cross section of the assembled emitter as inserted into the irrigation-line tubing.

The emitter embodiment shown in FIGS. 3 to 5 serves to keep the emitter output steady in spite of substantial variations in line pressure. To this end it is provided with an elastic diaphragm 24 seated in a recess in the core member 14. The upper surface of the diaphragm 24 constitutes the bottom of a chamber 26 into which leads the passage constituted by the recesses 16. Via an opening 28 which, in assembly, is aligned with the hole 20, the chamber 26 communicates with the neck portion 8, i.e., with the atmosphere. The lower surface of the diaphragm 24 is accessible to line pressure via the hole 30. The diaphragm 24 is sensitive to the difference of pressure acting on its lower and upper surface, respectively. If outflow through the opening is too large, the pressure in chamber 26 will drop and the line pressure, acting through the hole 30, will bulge the diaphragm inward, causing it to restrict access to the outflow opening 28, thus reducing outflow. If outflow drops below the rated amount, pressure in chamber 26 will increase, somewhat straightening the bulge and thereby increasing access to the opening 28, thus increasing outflow.

Figure 6:
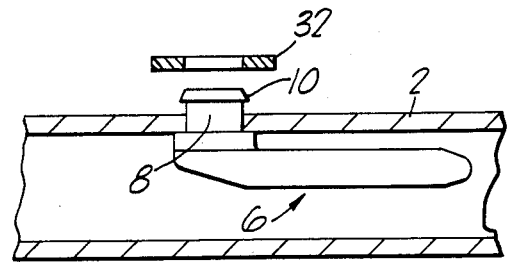
FIG. 6 shows an exploded view of yet another embodiment of an emitter.
Figure 7:
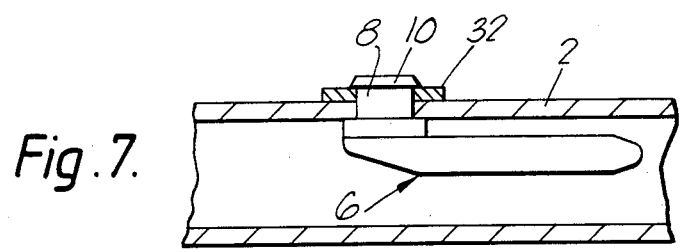
FIG. 7 shows the emitter of FIG. 6 as tightly secured to the irrigation-line tubing.

The embodiment illustrated in FIGS. 6 and 7 is provided with a securing member in the form of a washer 32 which is forced over the tapering rim portion 10 and snaps onto the neck portion 8 beyond the rim portion 10.

Figure 8:
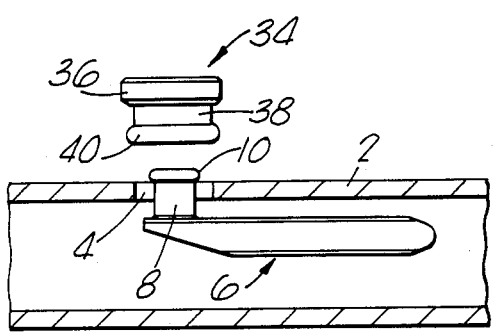
FIG. 8 is an exploded view of still another embodiment of an emitter.
Figure 9:
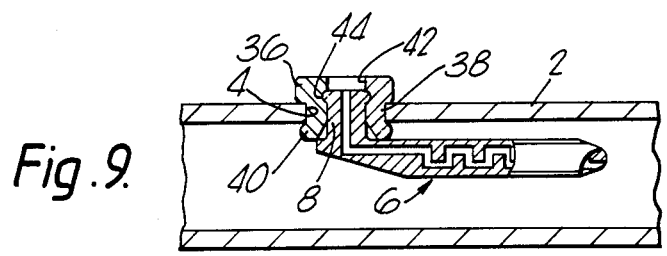
FIG. 9 is a schematic view of the emitter of FIG. 8 as tightly attached to the irrigation-line tubing.

The same problem of better securing and sealing the emitter is addessed by the embodiment of FIGS. 8 and 9, in which the securing and sealing member in the form of a sleeve 34 has a rim portion 36, a neck portion 38 and a bead portion 40. At its inside (see FIG. 9) there is provided a cylindrical bore 42, slightly flared at its lower end, and an annular groove 44 of appropriate shape and location to snap over, and securely hold, the beaded rim 10 of the reduced neck portion 8 of the emitter.

The body portion 6 of the emitters can be of any cross section-rectangular, square, round, elliptical, etc.

It should also be noted that the above-mentioned flow-attenuating means can also take the form of meandering grooves, vortex-forming recesses, baffles, and the like.

While in the first two embodiments which have been explained in detail, the flow-attenuating passage is produced between an appropriately shaped core member 14 and a casing 12, it would obviously be possible to produce such a passage in a different way, e.g., by splitting the flow path into an upper and a lower half, the upper half being integral with the neck portion 8 and the lower half being cemented to the upper half prior to the insertion of the emitter into the tubing 2.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An emitter for a drip irrigation line insertable into a length of tubing from the outside thereof, said emitter being substantially rigid and having a generally L-like shape, the longer elongated limb of which consists of a body portion thereof, which body portion is accomodatable inside said length of tubing and comprises flow attenuating means in the form of at least one labyrinth-type passage through which irrigation liquid enters said emitter, and the shorter limb of which consists of a neck portion of said emitter, through which neck portion said irrigation liquid exists said emitter, and by which neck portion said emitter is securable to said irrigation line.

2. The emitter as claimed in claim 1, wherein said body portion comprises a hollow, tubular casing and a core-like member adapted to be introduced thereinto, and wherein a labyrinth-like passage is formed by interconnected recesses in said core-like member in conjunction with at least part of the inside surface of said hollow casing.

3. The emitter as claimed in claim 1, wherein the free end of said neck portion is provided with an outwardly projecting rim portion.

4. The emitter as claimed in claim 2 further comprising a flexible diaphragm seated in a recess provided in said core-like member and, in the assembled state of said emitter, located opposite to said neck portion, one surface of which diaphragm is accessible to line pressure, the other surface of which defines an outlet chamber communicating, on the one hand, with said labyrinth-like passage and, on the other, via said neck portion, with the atmosphere.

5. The emitter as claimed in claim 2 further comprising a flexible diaphragm seated in a recess provided in said core-like member and located opposite to said neck portion, one surface of said diaphragm being accessible to line pressure, and the other surface of said diaphgram defining an outlet chamber communicating with said labyrinth-like passage and, via said neck portion, with the atmosphere.

* * * * *